Aug. 19, 1969 D. H. TROTT 3,462,055

MAGNETIC TAPE TRANSDUCER

Filed Nov. 22, 1967 5 Sheets-Sheet 1

INVENTOR
David H. Trott
BY
Wood, Herron and Evans
ATTORNEYS

Aug. 19, 1969 D. H. TROTT 3,462,055

MAGNETIC TAPE TRANSDUCER

Filed Nov. 22, 1967 5 Sheets-Sheet 2

INVENTOR
David H. Trott
BY
Wood, Herron and Evans
ATTORNEYS

Aug. 19, 1969 D. H. TROTT 3,462,055

MAGNETIC TAPE TRANSDUCER

Filed Nov. 22, 1967 5 Sheets-Sheet 3

INVENTOR.
David H. Trott
BY
Wood, Herron and Evans
ATTORNEYS

INVENTOR.
David H. Trott
BY
Wood, Herron & Evans
ATTORNEYS

Aug. 19, 1969 D. H. TROTT 3,462,055

MAGNETIC TAPE TRANSDUCER

Filed Nov. 22, 1967 5 Sheets-Sheet 5

INVENTOR.
David H. Trott
BY
Wood, Herron and Evans
ATTORNEYS

United States Patent Office
3,462,055
Patented Aug. 19, 1969

3,462,055

MAGNETIC TAPE TRANSDUCER

David H. Trott, Cincinnati, Ohio, assignor to Courier Enterprises, Cincinnati, Ohio, a limited partnership of Ohio Filed Nov. 22, 1967, Ser. No. 684,998
Int. Cl. B65h *17/42, 17/50, 17/22*
U.S. Cl. 226—108 11 Claims

ABSTRACT OF THE DISCLOSURE

A magnetic transducer in which an endless tape cartridge is movable in a first direction for slow speed drive and in a second direction for fast forward, the cartridge having a counter integral therewith.

This invention relates to a magnetic transducer and is particularly directed to magnetic recording and reproducing apparatus utilizing an endless tape cartridge.

The several features of the invention are particularly applicable to a small, inexpensive tape recorder having simplified controls wherein the tape cartridge is suitable for mailing, and whereby social and business messages can be mailed back and forth. However, it should be understood that the features of the invention are not necessarily restricted to this particular application.

Endless tape cartridges are in common use but they are used particularly for listening to pre-recorded music and the like. In operation, the endless tape cartridge is normally thrust into position in a magnetic reproduction device including an amplifier and the user listens to what has been recorded. Apparatus for recording and listening usually is of the type in which two reels are used, the two reels being required to enable the recorder to rewind quickly in order to re-record over mistakes or to listen to the last portion of the recorded material. The two-reel system is preferred to the single reel endless tape system because of the present impossibility of rewinding an endless tape. The two-reel system, however, has its disadvantages in a simple recording and listening device, these disadvantages particularly residing in the control mechanism required for winding tape in both directions and in the requirement of threading a magnetic tape onto a take-up reel before recording or listening can take place.

An objective of the invention has been to provide a simplified magnetic transducer in which the advantages of the simplicity of the endless tape cartridge are present, the invention being particularly directed to the provision of means for eliminating the disadvantages attending the ability of the endless tape to be driven only in a forward direction.

More specifically, it has been an objective of the invention to provide magnetic transducing apparatus in which an endless tape cartridge is driven at a slow speed for recording and listening and in which the tape is driven at a very high speed in the forward direction to enable the operator quickly to return to his previously recorded material. The structure by which this objective is attained requires merely that the cartridge be shifted from a slow drive position to a fast forward position wherein an independent fast forward capstan engages the tape to drive it at a lineal speed many times faster than the slow speed.

Employing the features of the invention, it is possible, by way of example, to provide an endless tape which can contain approximately twelve minutes of recording at slow speed but which can be driven, in the fast forward position, through a complete traverse of the tape in approximately twenty seconds.

While the fast forward condition of the apparatus is obtained by merely shifting the cartridge, in the preferred form of the invention a separate fast forward switch is used to energize the drive motor to permit closer control of the stopping point of the tape and to provide a slight drag on the tape upon stopping to eliminate the possibility of overtravel of tape coming out of the reel which tends to cause loose sections of tape to bunch up in the reel.

It has been another objective of the invention to provide a counter which does not require complex reduction gearing and which preferably is mounted on the endless cartridge in a position to provide visual monitoring of the position of the endless tape. Preferably the visible face of the counter is adapted to make one revolution with one complete traverse of the tape.

It has been another objective of the invention to provide a hypocycloid gear reduction counter for an endless tape cartridge in which a counter disc is caused to roll around a fixed ring through a spring connection between the tape reel and the counter disc. The spring biassing of the disc into rolling contact with the ring provides assurance that rolling contact will be maintained without requiring meshing gear teeth or special frictional surfaces between the contacting parts.

These and other objectives of the invention will become more readily apparent from the following detailed description taken in conjunction with the drawings in which.

Figure 1:
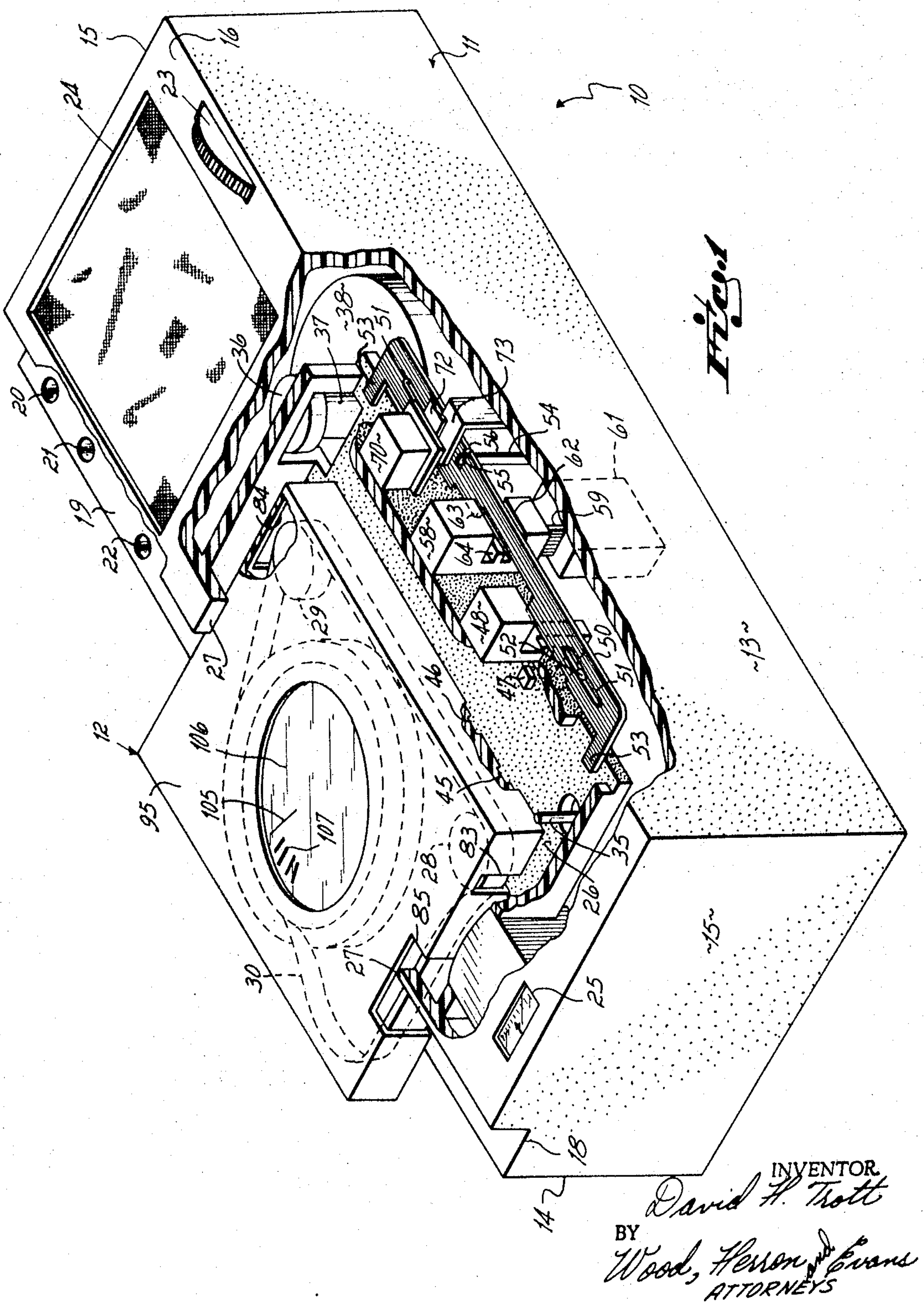
FIG. 1 is a perspective view of the apparatus of the invention with portions broken away for clarity.

The apparatus of the present invention is illustrated at 10 in FIG. 1 and includes a casing 11 within which the electrical and mechanical components are housed, the casing being adapted to receive an endless tape cartridge 12. The casing has a back wall 13, a front wall 14, side walls 15, and a top wall 16. The top wall is recessed as at 18 to facilitate the sliding introduction of the cartridge 12 into the casing and to provide a shelf 19 in which receptacles 20, 21 and 22 for jacks are mounted. The receptacles 20 and 21 receive jacks for a remotely controllable microphone and the receptacle 22 receives the jack for an ear plug. A control knob 23 projecting through top wall 16 provides an off-on switch and a volume control knob. The top wall also has an opening 24 for a speaker and a small opening 25 for a recording volume indicator. The controls thus far described are, of course, conventional.

Figures 3, 4:
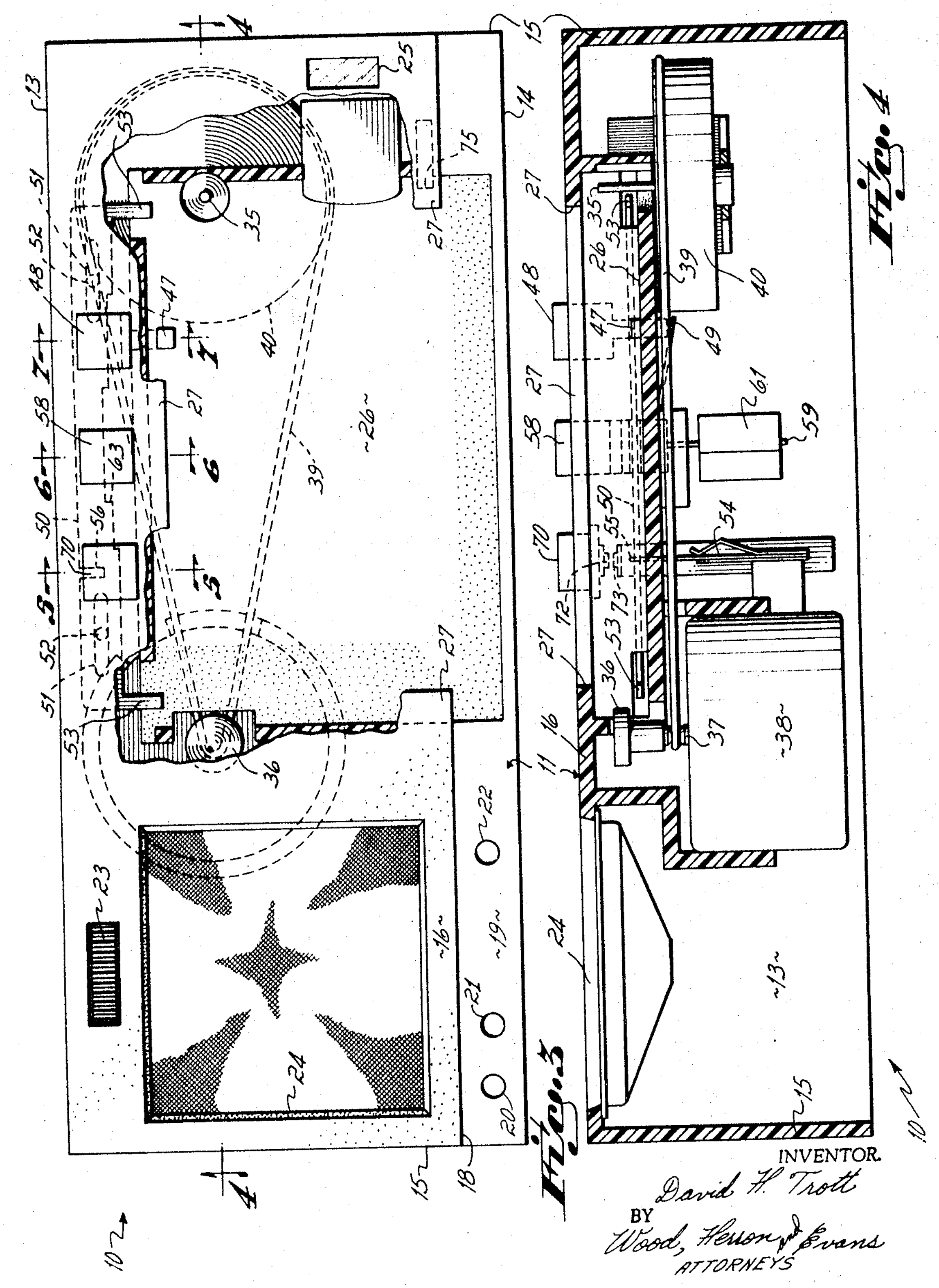
FIG. 3 is a top plan view partly broken away of the recorder apparatus.
FIG. 4 is a cross-sectional view taken along lines 4—4 of FIG. 3.
Figure 5:
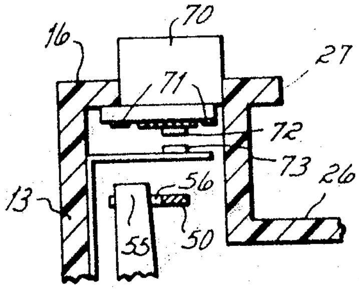
FIG. 5 is a cross-sectional view taken along lines 5—5 of FIG. 3.
Figure 6:
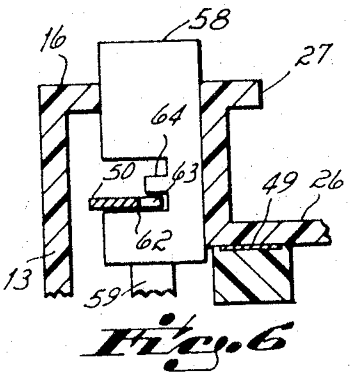
FIG. 6 is a cross-sectional view taken along lines 6—6 of FIG. 3.
Figure 7:
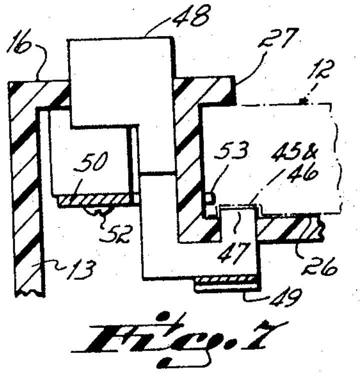
FIG. 7 is a cross-sectional view taken along lines 7—7 of FIG. 3.

The top wall is also recessed at 26 to receive the cartridge 12, the top wall providing a marginal flange 27 which overhangs the recess and provides a pocket into which the cartridge slides and by which the cartridge is retained. The cartridge has two pinch rollers 28 and 29 over which an endless tape 30 passes. The pinch roller 28 cooperates with a drive capstan 35 and the pinch roller 34 cooperates with a fast forward capstan 36. As shown in FIGS. 3 and 4, the fast forward capstan 36 is integral with a drive shaft 37 of a motor 38. An endless drive belt 39 is driven directly from the shaft 37 and passes over a large pulley 40 to which the drive capstan 35 is fixed and by which it is rotated.

The cartridge is placed in a drive mode by shifting it into engagement with the drive capstan 35 and it is placed in the fast forward mode by shifting it in the opposite direction into engagement with the fast forward capstan 36.

Figure 8:
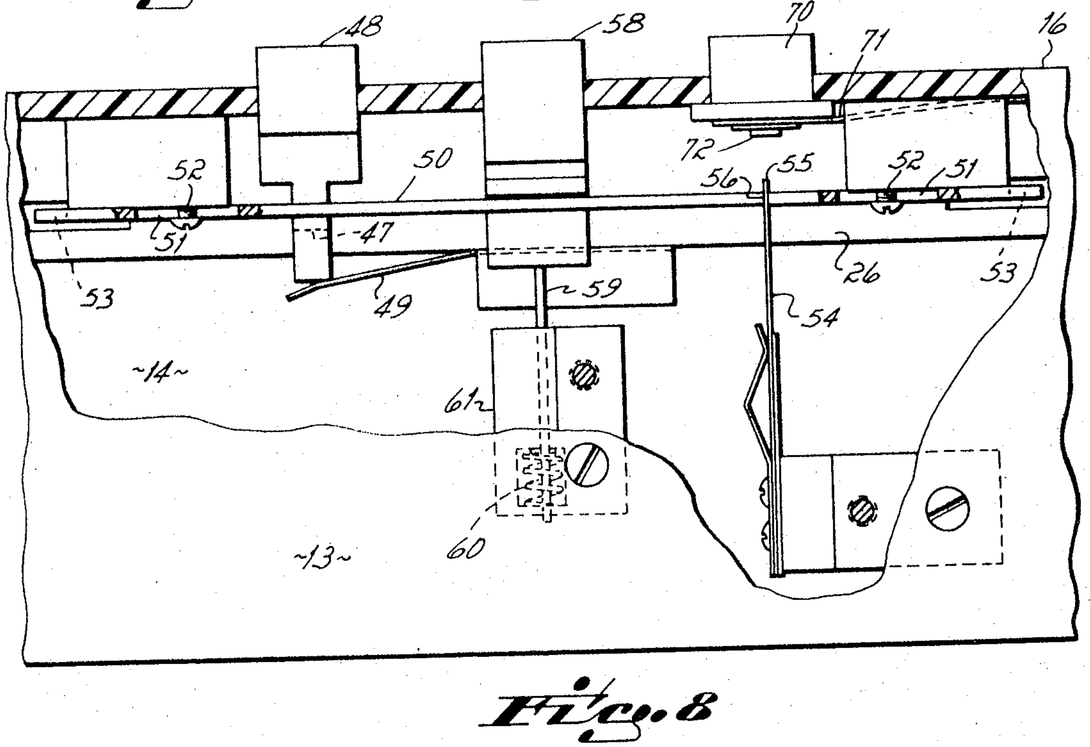
FIG. 8 is an enlarged fragmentary rear view of the push button controls.

In the preferred form of the invention the cartridge is retained in either of its two modes by a latching structure which includes recesses 45 and 46 in the bottom surface of the cartridge 12 and a detent 47 which projects into the recess 26 of the casing. The detent 47 is integral with a release button 48 which is urged by a spring 49 (FIG. 8) upwardly into a latching position. When the cartridge is moved toward the drive capstan 35, the detent 47 engages recess 46 and maintains the cartridge in that position unitl the release button is depressed. When the cartridge is moved toward the fast forward position, the detent 47 engages the recess 45 and maintains the cartridge in that position until the release button is depressed.

In either position of the cartridge, the cartridge is urged toward a center or neutral position in which it is in engagement with neither capstan by a slide bar 50. The slide bar 50 is slidably mounted in the casing by slots 51 and pins 52 and has lateral arms 53 projecting into the casing, the arms being spread apart a distance just sufficient to receive the cartridge. A leaf spring 54 is fixed at one end to the casing 11 and its other end 55 projects upwardly into a slot 56 in the slide bar 50. The spring 54 biases the slide bar 50 and hence the cartridge to its neutral position.

The slide bar 50 also provides a latching function for a record button 58. The record button 58 carries a contact bar 59 which is slidable in a contact receptacle 61 and is urged in an upward direction by a spring 60 in the contact receptacle. The contact receptacle contains the usual contacts required for shifting the electrical circuitry of a recorder from a listen function to a record function. The button 58 is notched as at 62 to receive the slide bar 50 and to permit it to pass freely in a longitudinal direction as the cartridge is shifted to either of its modes. The slide bar 50 has a shoulder 63 which is adapted to slide into the notch 62 and to overlie a latching rib 64 on the button 58 to hold the button in a depressed position in which the contact bar 59 places the apparatus in the record function. Thus, when the record button is depressed and the cartridge is shifted toward the drive capstan, the slide bar 50, engaging the shoulder 63 above the rib 64, will hold the record button in the record function and the detent 47 will hold the cartridge along with the slide bar 50 in the drive position.

Figure 10:
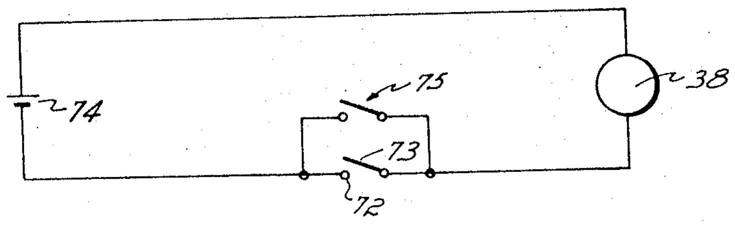
FIG. 10 is a circuit diagram of the motor control.

A fast forward button 70 may optionally be provided. The fast forward button is urged by a spring 71 in an upward direction. It carries a movable contact 72 which is engageable with a fixed contact 73 in circuit with the motor 38 and a power supply 74 (FIG. 10). The fast forward button is preferably used to energize the motor after the cartridge has been shifted to the fast forward position. Alternatively, the shifting of the cartridge itself to fast forward could be used to close a switch but it has been found that greater operator control is provided through the use of a separate fast forward button. Further, stopping the tape when it is moving at the very high speed of the fast forward mode through the engagement of it by the motor driven capstan prevents a spewing or spitting of the tape out of its reel and into the cartridge where it could become tangled. In other words, the fast forward capstan provides a useful frictional drag for more reliable operation.

The casing also contains a push button switch 75 whose contacts are in parallel with the contacts of the fast forward button and which projects into the recess 26 in the same side as the drive capstan 35. The switch 75 is engageable by the cartridge 12 when it is shifted to the drive mode and closes a circuit to the motor. Thus, the switch 75 provides for the automatic energization of the motor in the listen or record mode as soon as the cartridge is shifted to the listen or record position.

A combination magnetic head 76 is mounted adjacent the push button switch 75 and is engageable with the tape 30 when the cartridge is shifted to the listen-record function. The combination magnetic head provides the usual erase-record functions as well as the listen function. The head 76 and the associated circuitry has not been shown in detail for it is conventional.

Figure 2:
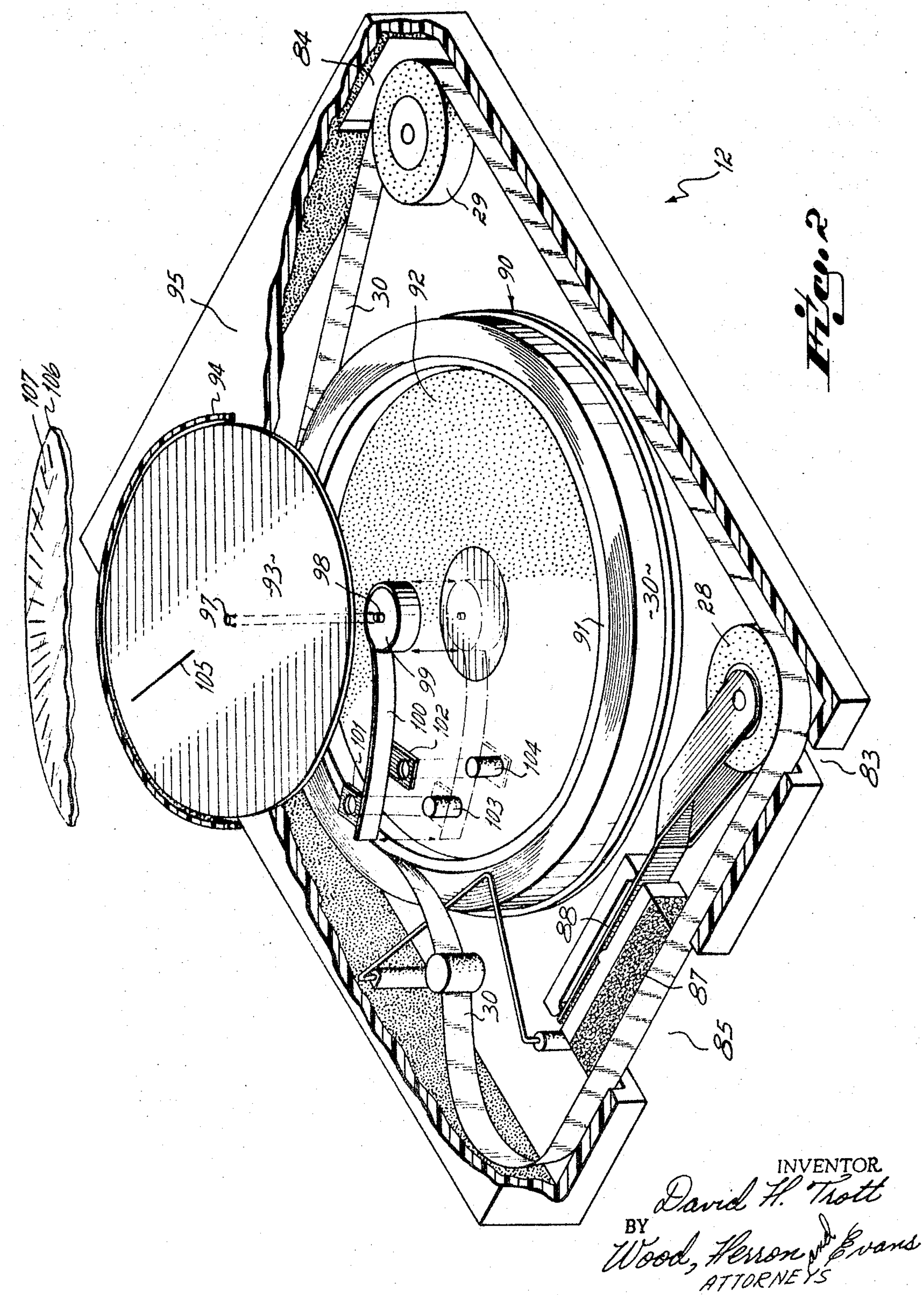
FIG. 2 is a disassembled perspective view of the endless tape cartridge illustrating the counter.

The cartridge is best illustrated in FIG. 2. Insofar as its tape handling function is concerned, it is a conventional endless tape cartridge. However, as indicated above, it contains a drive pinch roller 28 and a fast forward pinch roller 29, the casing having openings 83 and 84 which provide exposure of the tape and pinch roller for engagement with their respective capstans.

The casing is also open at 85 to expose the tape to the magnetic head 76. A pressure shoe 87 engaged by a leaf spring 88 is provided to hold the shoe and the tape against the magnetic head with the proper pressure.

Figure 9:
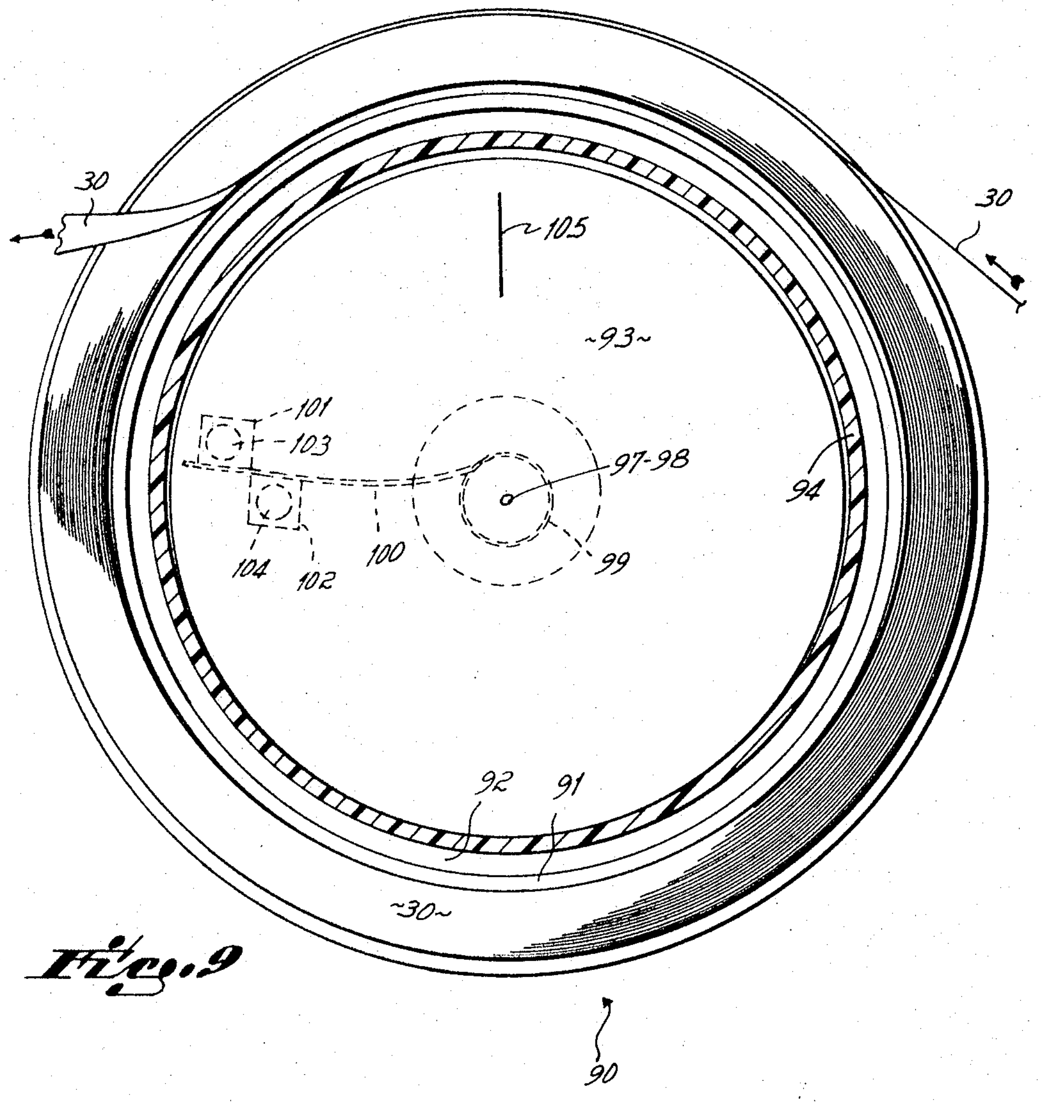
FIG. 9 is a top plan view partly in section of the endless tape reel and counter.

The tape is wound on a reel 90 rotatably mounted in the cartridge. The reel 90 has an upwardly projecting ring 91 about which the tape is wound. The ring 91 has an internal recess 92 over which a counter disc 93 is mounted. The periphery of the counter disc is engageable with a ring 94 formed in the top wall 95 of the cartridge. The counter disc 93 has a slightly smaller circumference than the circumference of the ring 94 to provide the speed reduction feature of the invention as will be described below. The counter disc 93 has a hole 97 by which it is rotatably mounted on a pin 98. The pin is carried by a bearing 99 which is freely supported at one end of a leaf spring 100. The leaf spring 100 has two ears 101 and 102 which pass over pegs 103 and 104, respectively, on the reel 90. The leaf spring, acting through the bearing 99 and the pin 98, urges the disc 93 into a point contact with the fixed ring 94. This relationship is illustrated in FIG. 9. As the reel 90 rotates at comparatively high speed, it carries the leaf spring with it and causes the disc to roll around the ring 94. Since the circumference of the disc 93 is less than the circumference of the ring 94, a point such as that indicated at 105 on the disc will be displaced an arcuate distance equal to the difference between the two circumferences for each revolution of the reel. Thus, if there is a circumferential difference between the two elements of .01 inch, the mark 105 will move around the circumference of the ring 94 only a distance of .01 inch for each revolution. In the preferred form of the invention, a transparent cover 106 is positioned over the counter disc 93, the transparent cover having calibration marks 107 which will enable the operator to observe the progress of the tape in relation to the recorded material. When necessary, the operator can very rapidly drive the reel to a particular point in his recording by using the fast forward function and following the progress of the disc marking 105 with respect to the calibration markings 107.

Operation

For the purpose of the description of the operation, let it be assumed that the device is used as a message-transmitting vehicle. The initial sender places a cartridge 12 in the casing by sliding it under the flanges 27 overhanging the recess 26. While depressing the record button 58, he shifts the cartridge 12 toward the drive capstan 35. This shifting of the cartridge performs a number of functions. First, it causes the latch detent 47 to enter the recess 46 in the bottom of hte cartridge to hold the cartridge in the drive mode. Second, it moves the slide bar 50 with the cartridge thereby bringing the shoulder 63 into a position overlying the rib 64 which holds the record button depressed. The depressing of the record button, of course, shifts the electrical circuitry to a record function as contrasted to its listening function when the record button is in its normal upper position. It also loads the centering spring 54 so that when the release button is depressed, the cartridge will be automatically brought to its center or neutral position. The movement of the cartridge also brings the tape and pinch roller into engagement with the drive capstan 35 and brings the tape into engagement with the magnetic head 76. Still further, the movement of the cartridge depresses the push button 75 to energize the motor. The motor is thus brought to a condition of readiness to record.

The conventional microphone controls applied to the jack receptacles 20 and 21 permit the motor to be operated from the microphone when the device is in the record mode. The sender then dictates or otherwise records the message which he intends to send. If the sender wishes to erase and re-record, he notes the position of the marker 105 with respect to the calibration markings 107. He then depresses the release button and shifts the cartridge to the fast forward position where it is held by the engagement of the detent with the recess 45 in the casing. In this position the tape and pinch roller 29 are engaged by fast forward capstan 36. By depressing the fast forward button 70, the tape can be driven through a complete traverse or cycle in a very short time as, for example, twenty seconds. The operator releases the fast forward button just as the mark 105 approaches the calibration marking 107 which was previously noted. Thereafter the cartridge is shifted back to the drive mode, without depressing the record button, and the device is automatically on a listen function either with the tape being driven automatically through the depressing of the switch 75 or by operation of the microphone switch. At the appropriate spot on the tape, the apparatus can be returned to the record function as described above.

After the message has been completed, the cartridge is inserted in the mailer and sent to a recipient having an identical unit. The recipient inserts the cartridge into the unit and shifts it into engagement with the drive capstan 35 whereupon it is latched into position. The motor is immediately energized by the engagement of the cartridge with the push button switch 75 and the recorded message is immediately reproduced. Thereafter the recipient can become the sender simply by recording his own message on the same tape.

While the invention has been described in relation to the use of a cartridge having two pinch rollers selectively driven by two spaced capstans, it should be understood that it is within the scope of the invention to employ a single pinch roller in the cartridge and to provide for the shifting of that single pinch roller into engagement with either of the drive or fast forward capstans. The embodiment described and illustrated herein is preferred because of the simplicity and reliability of the structure.

What is claimed is:

1. A magnetic transducing device comprising
a casing,
a drive capstan and a fast forward rotatably mounted in said casing,
means for rotating said capstans,
a cartridge movably mounted on said casing and containing at least one pinch roller and an endless tape passing over said roller,
said cartridge being selectively movable with respect to said capstans to sandwich said tape between a selected one of said capstans and a pinch roller.

2. A magnetic transducing device comprising
a casing,
a drive capstan and a fast forward capstan rotatably mounted in said casing,
means for rotating said capstans,
a cartridge mounted on said casing and containing two pinch rollers and an endless tape passing over said roller,
said cartridge being selectively movable toward said capstans to bring one of said rollers into engagement with a respective capstan.

3. A magnetic transducing device according to claim 2 in which said capstans are spaced apart and in which said cartridge is mounted between said capstans, the pinch rollers being located adjacent the respective capstans, whereby when said cartridge is shifted in one direction the tape is driven by the drive capstan and when the cartridge is shifted in the opposite direction the tape is driven by the fast forward capstan.

4. A magnetic transducing device according to claim 3 further comprising spring means mounted in said casing and connected to said cartridge to urge said cartridge to a neutral position spaced from each capstan.

5. A magnetic transducing device according to claim 4 further comprising cooperating latch means on said cartridge and casing, respectively, for holding said cartridge in the position in which its pinch roller engages said drive capstan.

6. A magnetic transducing device according to claim 5 further comprising a push button switch and circuit means connecting said switch to said capstan rotating means, said switch being located adjacent said drive capstan and engageable by said cartridge when said cartridge is in said latched position.

7. A magnetic transducing device according to claim 3 further comprising a bar slidably mounted in said casing and having two spaced arms engageable with opposite sides of said cartridge,
and spring means connected between said casing and said slide bar normally urging said slide bar to a neutral position in which it centers said cartridge between said capstans.

8. A magnetic transducing device according to claim 7 further comprising a record button mounted for sliding movement in a direction transverse to said slide bar, said record button having a rib mounted adjacent said slide bar, said slide bar having a shoulder engageable with said rib to hold said record button in a depressed position when said slide bar is shifted to a position in which said drive capstan is engaged by a cartridge pinch roller.

9. A magnetic transducing device according to claim 7 further comprising
cooperating latch means on said cartridge and casing, respectivly, for holding said cartridge in a position with its pinch roller engaging said fast forward capstan,
a spring biased fast forward push button mounted in said casing, and
circuit means associated with said push button for energizing said capstan rotating means when said push button is depressed.

10. A magnetic transducing device according to claim 2 further comprising a counter mounted on an exposed face of said cartridge and operatively connected to said tape to indicate the extent of the traverse of said tape through said cartridge.

11. A magnetic transducinng device according to claim 10 in which said counter includes a visible rotating member and speed reduction means connected between said tape and said rotating member to effect a single revolution of said rotating member for each complete traverse of said tape.

References Cited

UNITED STATES PATENTS

| | | | |
|---|---|---|---|
| 3,126,162 | 3/1964 | MacKenzie | 226—110 X |
| 3,335,929 | 8/1967 | Branco et al. | 226—108 |
| 3,385,497 | 5/1968 | Taraborrelli | 226—178 |
| 3,387,758 | 6/1968 | DeLany et al. | 226—108 |

ALLEN N. KNOWLES, Primary Examiner

U.S. Cl. X.R.

226—100, 118, 178; 235—103

UNITED STATES PATENT OFFICE
CERTIFICATE OF CORRECTION

Patent No. 3,462,055 Dated August 19, 1969

Inventor(s) David H. Trott

It is certified that error appears in the above-identified patent and that said Letters Patent are hereby corrected as shown below:

Column 5, line 15, "hte" should be --the--;
Column 6, line 3, after "forward" insert --capstan--
Column 6, line 65, "respectivly" should be --respectively--

SIGNED AND SEALED
JUL 7 1970

(SEAL)
Attest:

Edward M. Fletcher, Jr.
Attesting Officer

WILLIAM E. SCHUYLER, JR.
Commissioner of Patents